Figure 1:
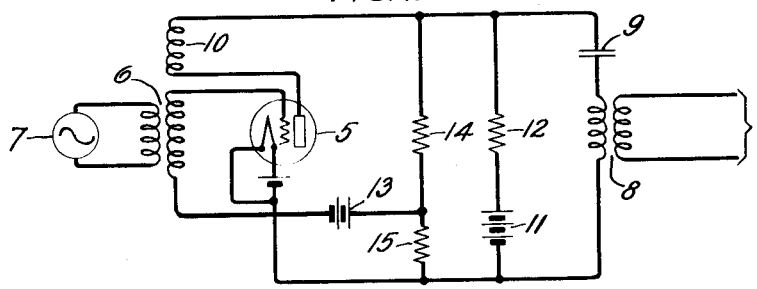

Oct. 29, 1929.          W. A. MARRISON          1,733,614

SUBHARMONIC FREQUENCY PRODUCER

Filed Aug. 20, 1927

INVENTOR
WARREN A. MARRISON
BY J. P. Neville
ATTORNEY

Patented Oct. 29, 1929

1,733,614

UNITED STATES PATENT OFFICE

WARREN A. MARRISON, OF ORANGE, NEW JERSEY, ASSIGNOR TO BELL TELEPHONE LABORATORIES, INCORPORATED, OF NEW YORK, N. Y., A CORPORATION OF NEW YORK

SUBHARMONIC FREQUENCY PRODUCER

Application filed August 20, 1927. Serial No. 214,433.

This invention relates to sub-harmonic frequency producers and has for an object to increase the stability of operation of such apparatus.

For many purposes it is desirable to be able to produce a wave, the frequency of which is a known fraction of the frequency of a given wave. Certain of the most satisfactory types of standard frequency generators, such as, piezo-electric controlled oscillators, can only be operated at comparatively high frequencies. When a standard low frequency is desired it is either necessary to use a more or less variable frequency source provided with means to stabilize its operation or to employ a standard high frequency generator associated with some system for stepping down the frequency of the wave produced thereby. The various systems heretofore employed for the latter purpose generally require a circuit very critically adjusted to the desired frequency which is, of course, undesirable.

In a specific preferred embodiment of this invention a sub-harmonic of the high frequency wave is produced by the use of an electric discharge device to the grid circuit of which the high frequency wave is supplied. The plate circuit of the discharge device includes a condenser, arranged to be charged through a resistance which determines the rate at which the condenser is charged. The grid is negatively biased with respect to the filament, so that normally no plate current will flow, and this bias is opposed by the action of a connection for supplying a positive grid potential proportional to the charge on the condenser.

As a charge accumulates on the condenser a point is reached at which the positive peak of the applied high frequency wave overcomes the negative grid bias and the space current path becomes conductive, thus permitting the condenser to discharge through the plate circuit which includes a feed-back connection to the grid circuit. As the flow of current through the feed-back path increases the grid is made more positive with respect to the filament, the plate current rises to a maximum value and the condenser charge is rapidly dissipated. The device then remains inactive until the condenser charge builds up sufficiently for another peak of the applied high frequency wave to start another discharge. By properly selecting the capacity of the condenser and adjusting the negative potential applied to the grid it is possible to cause the condenser to discharge once for any given number of cycles of the applied high frequency wave, to thereby produce an output wave, the frequency of which is a desired sub-multiple of the frequency of the applied high frequency wave.

It has been found that such a circuit is very stable and operates to produce an output wave the frequency of which may be controlled to have an exact ratio with respect to the input wave, without using a highly critical adjustment of the constants of the circuit elements.

Figure 2:
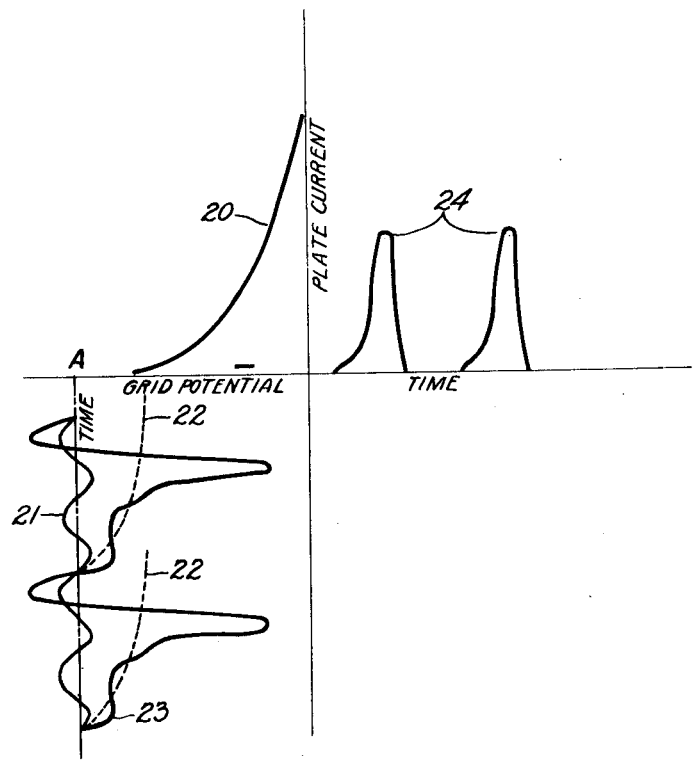

This invention will be more readily understood by reference to the following detailed description in connection with the drawing in which Fig. 1 shows diagrammatically one embodiment of the invention, and Fig. 2 shows curves illustrating graphically the operation of the circuit of Fig. 1.

Referring to Fig. 1, there is shown a three-electrode electric discharge device 5 having the secondary of an input transformer 6 associated with its input electrodes. Waves from a source 7 are supplied to the primary winding of the transformer 6. The space current circuit of the device 5 includes in series the primary winding of an output transformer 8, a condenser 9 and a feed back coil 10 of the input transformer 6. As explained hereinafter space current is supplied from the condenser 9 which is charged with current from a source 11 connected to the condenser in series with a resistance 12. A battery 13 is connected to the grid circuit to normally render the grid so negative with respect to the cathode that space current does not flow through the device 5. The positive terminal of the battery 13 is connected to the junction of two high resistance elements 14 and 15 which are connected in series across the condenser 9. These resistances constitute a potentiometer which applies to the grid of the device 5 a positive potential, opposed to the potential of the battery 13, and which is proportional to the charge upon the condenser 9.

The operation of the circuit can best be explained by reference to the curves of Fig. 2 in which the time increases in a direction upwardly or to the right along the two time axes. Curve 20 is a portion of the grid potential-plate current characteristic of the device 5. The potential applied to the grid from the battery 13 is of such negative value that the grid normally operates at the point A, about which the potential is varied by the wave from the source 7, as indicated by the curve 21. As the charge on the condenser 9 builds up, the grid potential becomes less negative due to the positive potential impressed thereon through the resistances 14 and 15. The effect of this varying potential is represented by curves 22. As the charge on the condenser builds up, the positive potential applied to the grid by the potentiometer 14—15 reaches such a value that finally the effect of the negative potential supplied by battery 13, is overcome by a positive peak of the input wave 21 and plate current begins to flow.

The flow of plate current through the feed back winding 10 causes a further reduction in the negative potential applied to the grid, thereby accentuating the flow of space current until a maximum is reached, which is determined by the charge accumulated on the condenser 9.

The capacity of condenser 9 is such that the charge accumulated thereon is almost instantly dissipated, the flow of space current decreases and ultimately the grid potential is restored to its original value A. The curve 23 shows the total voltage on the grid, and the curve 24 shows the plate current.

After the potential of the grid has been reduced to its original value A, the cycle of operations described above is repeated, as the condenser is again charged from the battery 11. By properly selecting the resistance of element 12 and the capacity of the condenser 9 the charging rate of the condenser, that is, the slopes of curves 22, may be controlled. In this way, the cycle of condenser charge and discharge can be caused to occur at any desired rate with respect to the frequency of the input wave supplied by the source 7, so as to produce in the output transformer 8 a wave which has for its fundamental a frequency which is a desired submultiple of the frequency of the input wave. In other words the slopes of curves 22 near their origins may be adjusted by choice of resistance element 12 and the capacity of condenser 9 so as to precipitate a discharge of the condenser 9 after a given number of cycles of the superposed wave from source 7. While the ratio of the frequency of the output wave to that of the input wave is determined by the relative values of the resistance 12 and the condenser 9, this relation is not highly critical.

The operation of the circuit described above is quite stable with a varying amplitude of input. In general, however, the stability decreases somewhat as the order of the sub-harmonic obtained is increased, so that in order to obtain a very high order of sub-harmonic, most stable operation can be obtained by using several circuits in tandem so as to obtain a successive frequency division. This may be done by connecting the terminal of the secondary winding of the output transformer 8 to the terminals of the primary of an input transformer similar to 6 in Fig. 1.

The more or less complex output wave resulting from the above described operation is adapted to be separated into its harmonic components, so as to obtain in addition to the fundamental, which may be, for example, a third or fifth sub-harmonic, waves of such frequencies as 2/3, 3/5, 5/3, etc. of the frequency of the original wave.

What is claimed is:

1. In combination, an electric discharge device having input and output circuits, a condenser connected in said output circuit, continuous current charging means for said condenser, and means for supplying to said input circuit a direct current potential proportional to the charge on said condenser.

2. In combination, a three-electrode electric discharge device having an input circuit, an output circuit including a feed-back circuit connecting said input and output circuits, a condenser connected in said output circuit, a source of potential and a resistance connected in series with each other to said condenser for charging it, and means for applying to the control electrode of said device a direct current potential proportional to the charge on said condenser.

3. A sub-harmonic frequency producer comprising an electric discharge device having a cathode, an anode and a control electrode, an input circuit therefor, an output circuit therefor including in series an output transformer, a condenser and a feed-back connection to said input circuit, a source of waves connected to said input circuit, a source of potential and a resistance connected in series for charging said condenser, a source of potential connected in said input circuit for negatively biasing said grid, and a connection for impressing upon said grid a positive direct current potential proportional to the charge on said condenser.

4. In combination, an electric discharge device having an anode, a cathode and a control electrode, an input circuit therefor, an output circuit therefor including a condenser and a feed-back connection to said input circuit, a source of electric waves connected to said input circuit, a source of potential and a resistance connected in series for charging said condenser, a source of grid biasing potential connected in said input circuit for normally preventing the flow of space current in said device, and connections for impressing upon said grid a positive direct current potential proportional to the charge on said condenser, whereby said electric waves periodically cause said condenser to discharge through the output circuit of said device to control the production of a wave of frequency which is a sub-multiple of the frequency of the wave from said source.

5. The method of operating a space discharge device, having a cathode, an anode and a grid or control electrode, input and output circuits therefor, a condenser connected in the space current circuit thereof, and means for charging the condenser, to produce a wave the frequency of which is a sub-harmonic of the frequency of a given wave, which comprises impressing the given wave on the input circuit of the device, negatively biasing the control electrode of said device so that the space current path is normally non-conductive, charging the condenser and simultaneously impressing on the control electrode a positive direct current potential proportional to the charge on the condenser, whereby, after a given number of cycles of the applied wave the space current path becomes conductive to produce a discharge through the output circuit.

6. A sub-harmonic frequency producer comprising an electric discharge device having input and output electrodes, means whereby an impulsive current flows between said output electrodes when a critical difference of potential exists between said input electrodes, and means whereby said difference of potential tends progressively to increase during intervals between such impulse current flow.

7. The combination as recited in claim 6 including additionally a source of independent potential variations connected to said input electrodes.

In witness whereof, I hereunto subscribe my name this 8 day of August, A. D., 1927.

WARREN A. MARRISON.